United States Patent [19]

Moczygemba

[11] 4,057,601

[45] Nov. 8, 1977

[54] BLOCK COPOLYMERS OF ALKADIENES AND MONOVINYL ARENES

[75] Inventor: George A. Moczygemba, Bartlesville, Okla.

[73] Assignee: Phillips Petroleum Company, Bartlesville, Okla.

[21] Appl. No.: 633,884

[22] Filed: Nov. 20, 1975

[51] Int. Cl.$^2$ .............................................. C08L 53/02
[52] U.S. Cl. ................................................. 260/880 B
[58] Field of Search .................................... 260/880 B

[56] References Cited

U.S. PATENT DOCUMENTS

| Re. 27,145 | 6/1971 | Jones | 260/880 B |
|---|---|---|---|
| 3,598,886 | 8/1971 | Hoeg | 260/880 B |
| 3,670,054 | 6/1972 | De La Mare | 260/880 B |
| 3,686,366 | 8/1972 | Winkler | 260/880 B |
| 3,700,748 | 10/1972 | Winkler | 260/880 B |
| 3,830,880 | 8/1974 | De La Mare | 260/879 |

*Primary Examiner*—Paul R. Michl

[57] ABSTRACT

A copolymer having the formula A—B—C is disclosed, which becomes a thermoplastic elastomer after essentially all the olefinic unsaturation therein has been removed by hydrogenation. A is a low vinyl poly-1,3-butadiene block, C is a poly(monovinyl arene) block, and B is either a block of acyclic, conjugated alkadiene containing 5-12 carbon atoms or a random copolymer block of at least one acyclic, conjugated alkadiene containing 4-12 carbon atoms, and at least one monovinyl arene containing 8-16 carbon atoms. The hydrogenated copolymer has the structure D—E—C in which D is essentially completely hydrogenated A, and E is block B from which the olefinic unsaturation is essentially removed by hydrogenation.

9 Claims, No Drawings

BLOCK COPOLYMERS OF ALKADIENES AND MONOVINYL ARENES

This invention relates to novel polymers. In one of its more specific aspects, this invention relates to novel thermoplastic elastomers.

Another aspect of this invention relates to a process for producing such polymers.

BACKGROUND OF THE INVENTION

Various synthetic rubbers made from alkadiene monomers and from monovinyl arenes are known in the art. Among these polymers are thermoplastic elastomers that are non-cured, olefinically hydrogenated copolymers of the monomers just described, such as polystyrene/hydrogenated polybutadiene/ polystyrene. The thermoplastic elastomers can be readily formed into useful articles which exhibit desirable tensile strength and elongation without curing. However, it would be desirable to have novel thermoplastic elastomers available that exhibit high tensile strength and elongation. Furthermore, it would be desirable to have such thermoplastic elastomers available which have broad temperature ranges in which they soften and finally become sufficiently fluid that they can be readily used in various fabrication procedures.

THE INVENTION

It is thus one object of this invention to provide new polymers.

Another object of this invention is to provide new copolymers of conjugated alkadienes and monovinyl arenes.

Still a further object of this invention is to provide novel block copolymers in which the olefinic unsaturation has been essentially removed by hydrogenation and which exhibit both thermoplastic and elastomeric properties after the hydrogenation.

A still further object of this invention is to provide a process for making these novel thermoplastic elastomers.

Further objects, advantages, details and embodiments of this invention will become apparent to those skilled in the art from the following detailed description of the invention, the examples and the appended claims.

In accordance with this invention, I have now found that a copolymer having the formula A—B—C, the meaning of A, B and C being defined in the following, becomes a thermoplastic elastomer after essentially all of the olefinic unsaturation therein has been removed by hydrogenation. The hydrogenated copolymer thus has rubbery properties, and at the same time can be handled and shaped like a thermoplastic polymer material.

Thus, the accordance with one embodiment of this invention, there is provided a novel block copolymer having the formula A—B—C, wherein A is a block of low vinyl poly-1,3-butadiene, B is selected from the group consisting of a. polymer blocks of acyclic, conjugated alkadiene having 5 to 12 C-atoms per monomer molecule, and b. random copolymer blocks of at least one acyclic, conjugated alkadiene containing 4 to 12 C-atoms per monomer molecule and at least one monovinyl arene containing 8 to 16 C-atoms monomer molecule, and C is a polymer block of a monovinyl arene containing 8 to about 16 carbon atoms. This novel block copolymer A—B—C is used to produce a thermoplastic elastomer by removing essentially all of the olefinic unsaturation by hydrogenation.

In accordance with another embodiment of this invention, there is provided a novel hydrogenated block copolymer having the formula D—E—C, wherein D is a hydrogenated block of low vinyl poly-1,3-butadiene, E is a block selected from the group consisting of a. hydrogenated polymer blocks of acyclic, conjugated alkadiene containing 5 to 12 C-atoms per monomer molecule, and b. random copolymer blocks of at least one acyclic, conjugated alkadiene containing 4 to 12 C-atoms per monomer molecule and at least one monovinyl arene having 8 to 16 C-atoms per monomer molecule, said random copolymer blocks having essentially all of the olefinic unsaturation hydrogenated, whereas the aromatic unsaturation in the arene units is essentially unchanged, and C is a poly(monovinyl arene) block as defined above. The terms "hydrogenation" and "hydrogenated" refer to the fact that at least about 95% of the olefinic unsaturations of the respective polymer of polymer block have been removed, leaving the aromatic unsaturation essentially unchanged, i.e., not removing more than about 5% of the aromatic unsaturation.

The novel hydrogenated block copolymer of this invention is a thermoplastic elastomer. In particular the polymer of this embodiment of the invention has high tensile strength and elongation. Furthermore, the polymer can be formed into an article of manufacture by the same procedure as are applied to thermoplastic polymers generally. The polymer of this embodiment of the invention possesses rubbery properties without curing.

The following explanation for block A applies to block D before hydrogenation as well. The block A is a poly-1,3-butadiene block having low vinyl content. It is important to this invention that this block is highly linear, i.e. contains as little branching as possible. It is, however, well known in the art that during the polymerization of 1,3-butadiene, the formation of a small percentage of pendant vinyl groups, which after hydrogenation are pendant ethyl groups, is unavoidable. The term "low vinyl content", therefore, refers to a vinyl content which is preferably below about 12 mol % of the total polymerized 1,3-butadiene in block A. In other words, the polymerization is preferably carried out so that a minimum of about 88 mol % of 1,4-polymerization, and only up to about 12 mol % of 1,2-polymerization occurs.

The block B and block E before hydrogenation, in accordance with one embodiment of this invention, is a polymer block of at least one acyclic, conjugated alkadiene having 5-12 carbon atoms. These alkadienes, whether they are branched or not, polymerize into a polymer block B, which after hydrogenation, has a methyl group or a larger alkyl group or aryl group or several such groups per monomer unit pendant from the polymer backbone such that the total number of carbon atoms per monomer unit does not exceed 12. Examples of suitable acyclic conjugated alkadienes containing 5–12 carbon atoms are isoprene, 2,3-dimethyl-1,3-butadiene, piperylene, 1,3-hexadiene, 3-butyl-1,3-octadiene, 2-phenyl-1,3-butadiene. Within this embodiment, isoprene is the presently preferred monomer for the central block B. Thus, in accordance with the most preferred embodiment, the non-hydrogenated copolymer of this invention has the structure low vinyl poly-1,3-butadiene/polyisoprene/polystyrene.

Block B and block E before hydrogenation in accordance with another embodiment, is a copolymer block of at least one acylic, conjugated alkadiene containing 4 to 12 C-atoms per monomer molecule and at least one monovinyl arene having 8 to 16 carbon atoms. Examples of suitable alkadienes are isoprene, 2,3-diemthyl-1,3-butadiene, piperylene, 3-butyl-1,3-octadiene, 2-phenyl-1,3-butadiene. Examples for the monovinyl arene are styrene, 3-methylstyrene, 4-propylstyrene, 4-cyclohexylstyrene, p-tolylstyrene, p-benzylstyrene, 1-vinylnaphthalene and 1-vinyl-5-butylnaphthalene. Styrene is the preferred monovinyl arene in this central copolymer block.

The block C is a block of monovinyl arene. The monovinyl arenes contain from 8 to about 16 carbon atoms per molecule. These compounds can carry no other substituent on the aromatic nucleus than the vinyl substituent or they can be additionally substituted on the aromatic nucleus by alkyl, cycolalkyl, aryl, alkaryl and aralkyl radicals. Examples of suitable monovinyl arenes which can be polymerized to form the block C are styrene, 3-methylstyrene, 4-propylstyrene, 1-vinylnaphthalene, 4-cyclohexylstyrene, p-tolylstyrene, p-benzylstyrene, 1-vinyl-5-butylnaphthalene. The presently preferred monomer for the block C is styrene.

The most preferred copolymer of this invention has the structure hydrogenated low vinyl poly-1,3-butadiene/hydrogenated polyisoprene/polystyrene.

The monomer ratio in weight percent in the entire copolymer for the three blocks can be varied considerably. In the follwing table the broad ranges and the preferred ranges for the monomers in the three blocks A, B and C are shown. These ranges also define the weight ranges for blocks D, E and F taking into consideration, however, that the olefinic unsaturations of the blocks have been removed by hydrogenation.

TABLE I

|  | A | B | C | Alkadiene/monovinyl arene ratio* |
|---|---|---|---|---|
| Broad Ranges (wt. %) | 5–50 | 10–90 | 1–50 | 95/5 to 50/50 |
| Preferred Ranges (wt. %) | 10–40 | 20–80 | 5–40 | 90/10 to 70/30 |

*This is the ratio in weight % of the total alkadiene to the total monovinyl arene in the copolymers A-B-C.

Also the number average molecular weight of the polymer A—B—C and polymer D—E—F correspondingly can vary in broad ranges. Generally, the molecular weight will be in the range of about 20,000 to about 400,000, the range of about 50,000 to about 200,000 being preferred. However, variances from the above ranges are within the scope of this invention. Such variances could be necessitated by, for instance, unusual utility requirements which are to be met.

In accordance with a further embodiment of this invention, there is provided a process for producing the polymers having the formula A—B—C as defined above.

In one embodiment of this invention, this process comprises polymerizing 1,3-butadiene essentially in the absence of vinyl promoting agents in a reactor under polymerization conditions, adding to the reaction product of the first polymerization step under polymerization conditions, at least one alkadiene monomer having 5–12 carbon atoms and polymerizing the alkadiene monomer having 5–12 carbon atoms onto the polymerization product of the first polymerization step, adding at least one monovinyl arene having 8–16 carbon atoms per molecule to the reactor and polymerizing the monovinyl arene under polymerization conditions. The process just described is either carried out in the sequence of steps used above or in the opposite sequence. In the first case, the vinyl-substituted aromatic monomers are polymerized onto the living copolymer having the structure A—B—. If the process is carried out in the opposite direction, the 1,3-butadiene is polymerized onto the living polymer C—B—. At the end of the process, the polymer is recovered in accordance with the procedures well known in the art.

The preferred class of polymerization initiators are the organomonolithium compounds of the formula RLi, wherein R is a hydrocarbyl radical having 1 to 20 carbon atoms being selected from the group consisting of alkyl, cycloalkyl, and aryl radicals which in turn can be unsubstituted or substituted by alkyl, cycloalkyl and aryl radicals. Examples of suitable organomonolithium initiators are methyllithium, isopropyllithium, n-butyllithium, secbutyllithium, t-octyllithium, n-dodecyllithium, n-eicosyllithium, phenyllithium, 1-naphthyllithium, p-tolyllithium, benzyllithium, 4-phenylbutyllithium, cyclohexyllithium, 4-cyclohexylbutyllithium. The amount of organomonolithium initiator employed frequently depends upon the desired molecular weight of the copolymer produced. The amount is normally in the range of about 0.1 to 100 millimoles per 100 grams of total monomers.

The polymerization in accordance with this invention is preferably carried out in the presence of a diluent. Suitable diluents are hydrocarbons which are preferably liquid at room temperature and atmospheric pressure, and which are not detrimental to the polymerization. Examples of suitable diluents of solvents are the paraffinic, cycloparaffinic, and aromatic hydrocarbons such as n-hexane, n-heptane, 2,2,4-trimethylpentane, cyclohexane, benzene, toluene, and the xylenes and mixtures thereof. The quantity of diluent employed can be varied broadly. A typical operation would employ the diluent in a quantity of about five to eight times the weight of all the monomers used.

As already indicated above, essentially no agent is employed during the polymerization of the 1,3-butadiene to form the block A, which would promote vinyl content within the polymer, i.e. would promote 1,2-polymerization. The degree of 1,2-polymerization occurring in the absence of vinyl promoting agents will normally be within the range of about 6 to about 12 mol % of the total polymerized 1,3-butadiene in block A.

Various materials are known in the art to be detrimental to the initiator system employed. Such materials include carbon dioxide, oxygen, and water. Therefore, it is desirable tht the reactants, initiators and polymerization zone be free of these materials, as well as of any other materials which may tend to interfere with the desired polymerization.

The polymerization process itself can be carried out by first introducing the diluent to the reactor followed by the first monomer, 1,3-butadiene. Thereafter, the initiator is charged followed by the monomer or monomers for the central block B and, finally, at least one monovinyl arene for the final block is added. Or the opposite charge order can be employed, i.e. monovinyl arene or arenes, monomers for the central block B, and finally 1,3-butadiene are charged. In this embodiment, wherein sequential monomer addition is employed, each monomer or group of monomers is essentially completely polymerized before the next monomer or group is introduced into the polymerization zone.

In accordance with a further embodiment of this invention, there is provided a process to produce those polymers A—B—C in which the central block B is a random copolymer block as defined. In order to produce the block copolymer with a random copolymer central block, the above described monomer addition sequence is modified in that the two monomers for forming the central block are added to the reactor vessel in the presence of a randomizing agent. Examples for such randomizing agents are tetrahydrofuran, 1,2-dimethoxyethane, triethylamine, N,N,N',N'-tetramethylethylenediamine, hexamethylphosphoramide, and potassium t-amyloxide. The presently preferred randomizing agent is tetrahydrofuran.

The monomers used to form each block A, B and C of the polymer can be conveniently polymerized in a batchwise process. The polymerization time for each monomer charge can be varied in broad ranges of a few minutes to about 6 hours, preferably from about 10 minutes to 2 hours. The polymerization temperature is broadly in the range of about 15° C to about 150° C, preferably in the range of 40° C to 90° C.

After the completion of the polymerization to provide the three block copolymer, the polymerization mixture is treated to remove the Li from the polymer. The rubbery polymers are then recovered. Both steps can be carried out together by steam stripping the diluent from the polymeric mixture. Another suitable method is to add alcohol to the polymer mixture, thus removing Li from the polymer and causing coagulation of the polymer; the polymer is then separated from the alcohol and the diluent by, for example, decantation or filtration optionally followed by exposure to reduced pressure.

It is preferred to add an antioxidant, such as 2,6-di-t-butyl-4-methylphenol, to a polymer solution prior to the recovery of the polymer.

In accordance with a preferred embodiment of this invention, there is provided a process to produce a thermoplastic elastomer polymer D—E—C. This process comprises the step of essentially removing by hydrogenation the olefinic unsaturation from the polymer A—B—C as defined above. The aromatic unsaturation remains essentially unchanged. This hydrogenation can be carried out after the polymer has been isolated. It is, however, presently preferred to add the hydrogenation catalyst to the mixture obtained by the polymerization and to carry out the hydrogenation without first performing the Li removal from the polymer and isolation steps.

The removal of olefinic unsaturation without removing substantial degrees of aromatic unsaturation is effected in the presence of a variety of hydrogenation catalysts of either the heterogeneous or the homogeneous type. Examples for suitable heterogeneous catalyst systems are nickel on kieselguhr, Raney nickel, copper chromite, molybdenum sulfide, and finely divided platinum or other noble metals on an inert carrier. Presently preferred, however, are homogeneous catalysts. Such homogeneous catalysts comprise a cobalt, nickel or iron carboxylate or alkoxide and an aluminum alkyl compound. An example of a presently preferred, homogeneous catalyst is that formed by the reaction of nickel octanoate and triethylaluminum. The polymer, preferably in solution in an inert solvent, is contacted with the catalyst under temperature conditions in the range of about 0° to 250° C and pressurization with hydrogen up to a total pressure of about 1,000 psig. The hydrogenation time can vary from 1 minute to 24 hours or more. The preferred hydrogenation conditions are temperatures in the range of 10 to 200° C, pressures of 10 to 500 psig, and hydrogenation times of about 10 minutes to 10 hours. The polymer is hydrogenated in solution, and the pressure is kept high enough to maintain the reaction mixture substantially in the liquid phase.

Upon the effective completion of the hydrogenation reaction, the hydrogenated polymer is isolated by conventional techniques. for example, the catalyst components can be converted to water soluble salts and washed from the polymer solution. Antioxidants, as specified above, can be added to the polymer and the polymer can then be coagulated. Filtration and decantation to isolate the polymer and finally removal of solvent traces under reduced pressure are further steps which are desirably employed to recover the pure polymer.

Compounding ingredients, such as fillers, dyes, pigments, softeners, reinforcing agents, and the like, can be used in compounding operations. Curing or crosslinking is not normally considered for the thermoplastic elastomers of this invention; it is, however, within the scope of this invention to vulcanize the polymers of the invention by employing appropriate conventional vulcanization procedures for vulcanizing polymers containing essentially no olefinic unsaturation, e.g., peroxide vulcanization.

The novel thermoplastic elastomers of this invention can be used in the fabrication of hoses, belting, extruded and molded goods for various applications in the field of building construction, automotive elements, medical and household articles.

The invention will be more fully understood from the following examples, which describe preferred embodiments of this invention, but are not intended to limit the scope thereof.

EXAMPLE I

Monomers, in quantities as shown in the following table, were polymerized by sequential monomer addition under nitrogen in capped beverage bottles employing anhydrous reactants and conditions. The bottles were tumbled in a constant temperature bath for the stipulated polymerization time and at the stipulated temperatures. Two runs were carried out in which the relative quantities of monomers were different as shown in the following tables. In each step the polymerization was continued until essentially complete.

| | Recipe and Conditions | |
|---|---|---|
| Step 1 | Run 1 | Run 2 |
| Cyclohexane, phm[a] | 520 | 520 |
| Styrene, phm | 25 | 15 |
| sec-Butyllithium, mhm[b] | 0.9 | 0.9 |
| Polymerization time, hrs. | 0.5 | 0.5 |
| Polymerization temperature, ° C | 70 | 70 |
| Step 2 | | |
| Isoprene, phm | 50 | 70 |
| Polymerization time, hrs. | 1 | 1 |
| Polymerization temperature, ° C | 70 | 70 |

-continued

| Recipe and Conditions | | |
|---|---|---|
| Step 3 | | |
| 1,3-Butadiene, phm | 25 | 15 |
| Polymerization time, hrs. | 1.5 | 1.5 |
| Polymerization temperature, °C | 70 | 70 |

[a]Parts by weight per hundred parts monomer.
[b]Gram millimoles per hundred grams of total monomer in all three steps.

In each run following the third polymerization step, one part by weight of 2,6-di-t-butyl-4-methylphenol per 100 parts by weight of polymer was added as an antioxidant. This antioxidant was added in a 50/50 volume ratio mixture of toluene and isopropyl alcohol. Thereafter, a sufficient quantity of isopropyl alcohol was added to coagulate the polymer. The coagulated polymer was collected by filtration and solvent traces were removed in a vacuum oven.

The rubbery polymer was evaluated with results shown in the following table:

| Properties of Parent Polymers | | |
|---|---|---|
| | Run 1 | Run 2 |
| Inherent viscosity[a] | 1.31 | 1.42 |
| Gel content, wt. %[b] | 0 | 0 |
| $M_w \times 10^{-3}$ [c] | 168 | 184 |
| $M_n \times 10^{-3}$ [c] | 101 | 91 |

[a] Inherent viscosity determined in accordance with U.S. PAT. 3,278,508, column 20, note a with the modification that the solution was not filtered through a sulfur absorption tube, but rather a sample of the solution was filtered through a fritted glass filter stick of grade C porosity and pressured directly into the viscometer.
[b] The gel content of the polymer was determined in weight percent in accordance with U.S. PAT. 3,278,508, column 20, note b.
[c] Weight average molecular weight, $M_w$, and number average molecular weight, $M_n$, were determined by gel permeation chromatography in accordance with the method of G. Kraus and C. J. Stacy, J. Poly. Sci. Symposium No. 43, 329-343 (1973).

EXAMPLE II

The block copolymers obtained in Example I was hydrogenated as follows. The cyclohexane solution of the polymer containing approximately 10 wt. % of the polymer was subjected to hydrogenation employing a nickel hydrogenation catalyst. This nickel hydrogenation catalyst was preformed by the triethylaluminum reduction of nickel octanoate in a mol ratio of 2:1. The catalyst was employed at a level of 5 millimoles nickel per 100 grams of polymer. The hydrogenation was carried out under approximately 50 psig hydrogen pressure and a temperature of 70° C for 2 hours.

Following this hydrogenation, one part by weight of 2,6-di-t-butyl-4-methylphenol per 100 parts by weight of rubber was added as an antioxidant. This antioxidant was added as a solution in a 50/50 volume ratio mixture of toluene and isopropyl alcohol. The polymer was coagulated in isopropyl alcohol, collected on a filter, and solvent traces were removed in a vacuum oven.

The polymers obtained were thereafter tested. Tensile strength and elongation values are determined. The results of these tests were shown in the following table.

| Properties of Hydrogenated Polymers | | |
|---|---|---|
| | Run 1 | Run 2 |
| Tensile, psi[a] | 5900 | 4200 |
| Elongation, psi[a] | 1150 | 1400 |

[a]ASTM D 412-66 was modified in that the neck of the dumbbell sample had dimensions 1 in. long, 0.125 in. wide, 0.03 in. thick.

As can be seen from the results shown above, the thermoplastic elastomers of this invention possess remarkably high tensile strength and elongation values.

EXAMPLE III

In this example, 6 runs were carried out to produce polymers using the technique of sequential monomer addition. The quantities of monomers, the initiator, the reactor conditions, etc., are shown in the following tables.

| Recipe and Conditions | |
|---|---|
| Step 1 | |
| Cyclohexane, phm | 545 |
| 1,3-Butadiene, phm | Variable |
| n-Butyllithium, mhm | Variable |
| Polymerization time, min. | 45 |
| Polymerization temperature, °C | 70 |
| Step 2 | |
| Isoprene, phm | Variable |
| Polymerization time, min. | 45 |
| Polymerization temperature, °C | 70 |
| Step 3 | |
| Styrene, phm | Variable |
| Polymerization time, min. | 45 |
| Polymerization temperature, °C | 70 |

An amount of isopropyl alcohol equivalent to the lithium present was added as a dilute solution in cyclohexane to remove Li from the polymer. Each polymer solution of the 6 runs were sampled for coagulation in isopropyl alcohol, isolation and physical property determination. The properties of each unhydrogenated or parent polymer are shown in the following table.

| Recipe Variables and Parent Polymer Properties | | | | | | |
|---|---|---|---|---|---|---|
| | Run | | | | | |
| Step 1 | 3 | 4 | 5 | 6 | 7 | 8 |
| 1,3-Butadiene, phm | 15 | 15 | 20 | 20 | 20 | 20 |
| n-Butyllithium, mhm | 1.70 | 1.20 | 1.75 | 1.25 | 1.75 | 1.25 |
| Step 2 | | | | | | |
| Isoprene, phm | 70 | 70 | 70 | 70 | 60 | 60 |
| Step 3 | | | | | | |
| Styrene, phm | 15 | 15 | 10 | 10 | 20 | 20 |
| Properties of the parent polymers (unhydrogenated): | | | | | | |
| Inherent viscosity | 0.78 | 1.11 | 0.80 | 1.06 | 0.80 | 1.02 |
| Gel, wt. % | 0 | 0 | 0 | 0 | 0 | 0 |
| Estim. molecular weight $\times 10^{-3}$ [a] | 75 | 125 | 75 | 125 | 75 | 125 |

[a]Molecular weight, essentially number average, based on initiator level and peak height on gel permeation chromatography scan.

EXAMPLE IV

The polymer solutions of the 6 runs obtained in Example III were thereafter subjected to a hydrogenation treatment as described in Example II. Following the hydrogenation, an antioxidant was added and the polymer was coagulated and recovered as described in Example II. The polymers obtained were again evaluated. polymers and the results are shown in the following table.

| | Properties of the Hydrogenated Polymer | | | | | |
|---|---|---|---|---|---|---|
| | Run | | | | | |
| | 9 | 10 | 11 | 12 | 13 | 14 |
| Melt flow | 9.4 | 1.0 | 14.7 | 1.0 | 12.0 | 2.7 |
| 300% Modulus | 720 | 660 | 615 | 600 | 840 | 950 |
| Tensile (25° C), psi | 1000 | 1270 | 940 | 1140 | 1000 | 1160 |
| Tensile (70° C), psi | 275 | 340 | 250 | 315 | 305 | 380 |
| Elongation (25° C), % | 500 | 740 | 510 | 730 | 410 | 450 |
| Elongation (70° C), % | <100 | 135 | <100 | 115 | <100 | 105 |
| Permanent set, % | 19 | 20 | 17 | 18 | 27 | 31 |
| Shore A Hardness | 75 | 73 | 72 | 71.5 | 78.5 | 79.5 |

The results of these evaluations are shown in the following table.

The results of the table above again indicate that the hydrogenated polymers of this invention possess a sub-

| | Properties of the Hydrogenated Polymers | | | | | |
|---|---|---|---|---|---|---|
| | Run | | | | | |
| | 3 | 4 | 5 | 6 | 7 | 8 |
| Melt flow[a] | 8.7 | 0.8 | 15.3 | 0.7 | 9.5 | 1.0 |
| 300% Modulus[b] | 530 | 510 | 540 | 545 | 740 | 655 |
| Tensile (25° C), psi[b] | 650 | 820 | 810 | 985 | 880 | 1040 |
| Tensile (70° C), psi | 195 | 250 | 205 | 280 | 250 | 315 |
| Elongation (25° C),%[b] | 350 | 600 | 440 | 700 | 370 | 660 |
| Elongation (70° C), % | <100 | <100 | <100 | <100 | <100 | 115 |
| Permanent set, %[b] | 13 | 13 | 14 | 14 | 18 | 18 |
| Shore A Hardness[c] | 68 | 68 | 69 | 69 | 74 | 72 |

[a]Melt flow as g/10 min. at 200° C/21.6 kg., ASTM D 1238.
[b]ASTM D 412-66.
[c]ASTM D 2240-68.

The results of the above-shown table again demonstrate that the polymers after hydrogenation are rubbery and possess tensile strength and elongation without curing. The properties vary in accordance with changes in the initiator level and the monomer ratio.

EXAMPLE V

Six further runs were carried out in accordance with this invention. The recipe and conditions were the same as those shown in Example III. The monomer ratio and the initiator level used are shown in the following table. Also shown in the following table are the properties of the unhydrogenated parent polymers. The procedure employed in polymer synthesis and evaluation were the same as those given in Example III.

| | Recipe and Properties of the Parent Polymer | | | | | |
|---|---|---|---|---|---|---|
| | Run | | | | | |
| Step 1 | 9 | 10 | 11 | 12 | 13 | 14 |
| 1,3-Butadiene, phm | 25 | 25 | 25 | 25 | 25 | 25 |
| n-Butyllithium, mhm | 1.50 | 1.10 | 1.50 | 1.10 | 1.50 | 1.10 |
| Step 2 | | | | | | |
| Isoprene, phm | 60 | 60 | 65 | 65 | 50 | 50 |
| Step 3 | | | | | | |
| Styrene, phm | 15 | 15 | 10 | 10 | 25 | 25 |
| Properties of the parent polymer (unhydrogenated): | | | | | | |
| Inherent viscosity | 0.80 | 1.02 | 0.79 | 1.07 | 0.72 | 0.99 |
| Gel, Wt. % | 0 | 0 | 0 | 0 | 0 | 0 |
| Estim. $M_w \times 10^{-3}$ | 75 | 125 | 75 | 125 | 75 | 125 |

EXAMPLE VI

The polymers obtained in Runs 9-14 of Example V were hydrogenated, employing a catalyst level of 3 gram millimole nickel per 100 grams polymer. Otherwise, the hydrogenation and polymer isolation procedures of Example II were followed. The physical property values were determined for these hydrogenated stantial tensile strength and elongation without crosslinking. The properties vary in accordance with differences in monomer ratio and initiator level.

Reasonable variations and modifications, which will be apparent to those skilled in the art, can be made in this invention without departing from the spirit and scope thereof.

I claim:

1. A copolymer having the structure D-E-C, wherein
   D is a hydrogenated block of low vinyl poly-1,3-butadiene,
   E is a hydrogenated polyisoprene block, and
   C is a polystyrene block.

2. A copolymer in accordance with claim 1 wherein the weight percentages of the three blocks in the entire copolymer before hydrogenation are in the range of
   5 to 50 weight percent of low vinyl poly-1,3-butadiene,
   10 to 90 weight percent of polyisoprene, and
   1 to 50 weight percent of polystyrene.

3. A process for producing a copolymer comprising
   a. introducing 1,3-butadiene into a reactor and polymerizing the 1.3-butadiene in the presence of a polymerization catalyst and under polymerization conditions and essentially in the absence of vinyl promoting agents until essentially all the 1,3-butadiene has polymerized, b. adding isoprene to the reaction product of the first polymerization step, and polymerizing essentially all the monomers introduced in step *b* under polymerization conditions, c. adding styrene to the reactor and polymerizing this styrene under polymerizing conditions until essentially all of this monomer has polymerized, with the further provision that the process steps are either carried out in the sequence a—b—c or in the sequence c—b—a, d. hydrogenating essentially all the olefinic unsaturation of the polymer produced leaving the aromatic unsaturation essentially unchanged, and e. recovering the polymer as the product of the process.

4. A process in accordance with claim 3 wherein the first polymerization step is carried out in the presence of an organomonolithium initiator and an inert organic diluent.

5. A process in accordance with claim 4 wherein the organomonolithium initiator has the formula RLi, where R is a hydrocarbyl radical having 1 to about 20 carbon atoms and is selected from the group consisting of alkyl, cycloalkyl, and aryl radicals which can be unsubstituted or substituted by alkyl, cycloalkyl, and aryl radicals.

6. A process in accordance with claim 3 where 5 to 50 wt. % of 1,3-butadiene are added to the reactor during step *a*, 10 to 90 wt. % of the monomers defined in step *b* are added during step *b* and 1 to 50 wt. % of monovinyl arene are added during the step *c*.

7. A process in accordance with claim 3 wherein the hydrogenation is carried out with the reaction mixture obtained by the steps *a*, *b* and *c*, without prior isolation of the polymer, and wherein the hydrogenated polymer is thereafter isolated.

8. A process in accordance with claim 3 wherein the hydrogenation is carried out in the presence of a catalyst system consisting essentially of the reaction product of alkyl aluminum with a compound selected from the group consisting of the carboxylates and alkoxides of cobalt nickel and iron.

9. A process in accordance with claim 3 wherein the hydrogenation is carried out in the presence of the triethylaluminum/nickel octanoate catalyst system.

* * * * *